(12) United States Patent
Kraus

(10) Patent No.: US 9,150,420 B2
(45) Date of Patent: Oct. 6, 2015

(54) CONICAL GRAPHITE ELECTRODE WITH RAISED EDGE

(75) Inventor: Heinz Kraus, Zeilarn (DE)

(73) Assignee: Wacker Chemie AG, Munich (DE)

( * ) Notice: Subject to any disclaimer, the term of this patent is extended or adjusted under 35 U.S.C. 154(b) by 482 days.

(21) Appl. No.: 13/032,816

(22) Filed: Feb. 23, 2011

(65) Prior Publication Data

US 2011/0226628 A1 Sep. 22, 2011

(30) Foreign Application Priority Data

Mar. 19, 2010 (DE) .................... 10 2010 003 069

(51) Int. Cl.
*H05B 7/06* (2006.01)
*C23C 16/00* (2006.01)
*C01B 33/035* (2006.01)

(52) U.S. Cl.
CPC .................... *C01B 33/035* (2013.01)

(58) Field of Classification Search
CPC ............. C01B 33/035; C23C 16/4411; C23C 16/4418; C23C 16/24; C23C 16/458; H01M 4/96; Y02E 60/50; C30B 29/06; C30B 13/00; C04B 41/5001
USPC ................. 373/36, 37, 38, 54, 55, 88, 91, 92; 204/284, 206; 205/157; 117/218, 911; 117/87; 219/541; 118/724, 725; 427/543; 423/348, 349
See application file for complete search history.

(56) References Cited

U.S. PATENT DOCUMENTS

| | | | |
|---|---|---|---|
| 3,676,324 A | 7/1972 | Mills | |
| 4,141,764 A * | 2/1979 | Authier et al. | 438/88 |
| 4,435,816 A * | 3/1984 | Belz et al. | 373/91 |
| 5,284,640 A | 2/1994 | Jernegan et al. | |
| 6,639,192 B2 | 10/2003 | Hertlein et al. | |
| 2009/0180512 A1 * | 7/2009 | Frastaci | 373/88 |
| 2009/0238992 A1 * | 9/2009 | Endoh et al. | 118/725 |
| 2009/0314207 A1 | 12/2009 | Endoh et al. | |
| 2010/0147219 A1 * | 6/2010 | Hsieh et al. | 118/723 R |

FOREIGN PATENT DOCUMENTS

| | | |
|---|---|---|
| CN | 101613106 A | 12/2009 |
| DE | 23 28 303 | 1/1975 |
| EP | 2138459 A1 | 12/2009 |
| EP | 2161241 A2 | 3/2010 |
| GB | 2 135 334 A | 8/1984 |
| WO | WO 2010/133386 A1 | 11/2010 |

OTHER PUBLICATIONS

Machine translation provided by PatBase for De 23 28 303.

* cited by examiner

*Primary Examiner* — Hung D Nguyen
(74) *Attorney, Agent, or Firm* — Caesar Rivise, PC

(57) ABSTRACT

A carbon electrode has a conical or pyramidal tip, wherein the tip is surrounded on its side by a raised edge.

17 Claims, 6 Drawing Sheets

CONICAL GRAPHITE ELECTRODE WITH RAISED EDGE

BACKGROUND

The invention relates to a carbon electrode having a conical or pyramidal tip, which is surrounded on its side by a raised edge.

Graphite electrodes are used in many different applications in industry. Examples of these are aluminum and steel production, electrolysis of salt melts, electrolytic decomposition of chemical compounds, thermal deposition reactions, arc welding, measuring instruments and many others.

One important application is the deposition of polysilicon by the Siemens process, in which highly pure elementary silicon is deposited from the gas phase on the surface of silicon rods. In this case, elemental silicon is deposited from a mixture of hydrogen and halosilanes, or a silicon compound containing hydrogen, in the gas phase, onto the surface of a thin silicon rod heated to from 900 to 1200° C. in a deposition reactor.

The silicon rods are held in the reactor by special electrodes, which generally consist of highly pure electrographite. Two thin rods with different voltage polarity on the electrode holders are respectively connected by a bridge at the other thin rod end to a closed electrical circuit. Electrical energy for heating the thin rods is supplied through the electrodes and their electrode holders. The diameter of the thin rods then grows. The electrode simultaneously grows, starting at its tip, into the rod foot of the silicon rods. After a desired setpoint diameter of the silicon rods has been reached, the deposition process is ended. The incandescent silicon rods are cooled and removed.

Particular importance is attached here to the material and the shape of the electrodes. They are used on the one hand for holding the thin rods, passing the flow of current into the silicon rod, but also for heat transfer as well as a secure support for the growing rod in the reactor. Since the trend is toward increasingly long and heavy rods and the rod pairs, which by now may weigh several hundred kilograms, are anchored in the reactor only by means of the electrodes, the choice of shape and material composition is in particular very important.

Also, depending on the subsequent use, very different requirements are placed on the silicon rods produced in this way and their deposition process—and therefore on the electrodes. If, for example, the polycrystalline silicon is subsequently used as crushed silicon for solar and electronic applications, the silicon rods must not collapse during or after the deposition process in the deposition reactor. Long and thick polycrystalline silicon rods increase the economic viability of the deposition process, but also the risk of collapse in the reactor.

Electrodes according to the prior art consist of a cylindrical main body in the lower part and a conical tip in the upper part. A hole for receiving the thin rod is formed in the conical tip. The lower end of the electrode is placed in a metal electrode holder, through which the current is supplied. Such electrodes are widely known and are used, for example in U.S. Pat. No. 5,284,640, for silicon deposition.

Graphite is mainly used as the material for the electrodes, since graphite is available with very high purity and is chemically inert under deposition conditions. Graphite furthermore has a very low electrical resistivity.

U.S. Pat. No. 6,639,192 describes a graphite electrode having a conventional shape. It consists of a cylindrical main body with a conical tip. The tip contains a hole for receiving the thin rod. The electrode is made in one piece and therefore from a material (here electrographite) with homogeneous material properties. It has, in particular, a very high specific thermal conductivity. A disadvantage with this embodiment is a high frequency of collapse before and during the deposition until the final diameter is reached.

DE 2328303 describes a cylindrical electrode without a tip. The carrier rod is fitted into a hole on a plane surface. This electrode shape has very high thermal dissipation even with a small rod diameter, owing to the solid cylindrical shape. So that the rods with a small diameter do not collapse during the deposition process, the electrode must have a low thermal dissipation, i.e. have a small diameter, and the electrode material must have a very low specific thermal conductivity. Thick rods, as are customary nowadays, cannot be deposited with this electrode shape since, owing to the small electrode diameter and the low specific thermal conductivity of the electrode material, the high energy required for thick rod diameters cannot be dissipated from the rod feet.

Graphite electrodes consisting of a plurality of layers are known from other fields. In these cases, however, the arrangement of different layers is intended to optimize chemical conversions. For example, U.S. Pat. No. 3,676,324 discloses a cylindrical graphite electrode which consists of a cylindrical inner part and a cylindrical outer part, the inner part having a very high electrical conductivity and the outer part being porous graphite. The purpose of these multiple layers is to avoid high voltage losses and obtain a high chemical conversion on the porous surface. A similar electrode having two different layers is known from GB 2135334, in which case the porous outer layer is used for the electrolytic production of fluorine.

A disadvantage with all electrodes known from the prior art is that they are relatively susceptible to cracking or flaking of material at the transition between the electrode and the silicon rod or in the silicon rod, in the vicinity of the electrode, so that they make the silicon rod unstable.

Collapsed batches entail great economical loss. If the silicon rods collapse, for example, the reactor wall may be damaged. The collapsed silicon rods are then contaminated by contact with the reactor wall and must be cleaned on the surface. Furthermore, collapsed batches can be removed from the reactor only with increased outlay. The surface of the silicon is then further contaminated.

It was an object of the invention to provide an electrode with which the frequency of collapse is reduced considerably compared with electrodes of conventional design.

Surprisingly, it has been found that a carbon electrode having a conical or pyramidal tip, which is surrounded on its side by a raised edge, has improved thermal dissipation during growth of the filament rod fastened in it and an improved distribution of the current density in relation to the rod thickness.

SUMMARY OF THE INVENTION

The invention provides a carbon electrode having a conical or pyramidal tip, which comprises a device for receiving a filament rod, wherein the conical or pyramidal tip is surrounded on its side by at least one raised edge.

BRIEF DESCRIPTION OF THE DRAWINGS

The invention, together with objects and advantages thereof, may best be understood by reference to the following description together with the accompanying drawings in which.

DETAILED DESCRIPTION OF PREFERRED EMBODIMENTS

Figure 1:
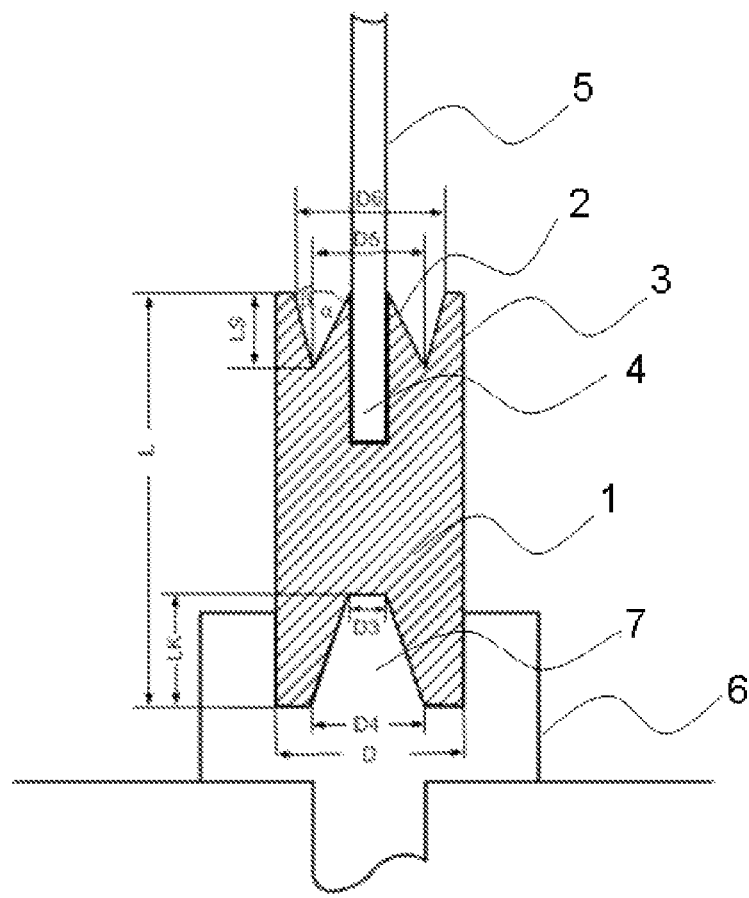
FIG. 1 shows an embodiment of an electrode according to the invention.

The electrode according to the invention (FIG. 1) consists of a cylindrical main body (1) having a tip (2), which is surrounded by a raised edge (3). A cavity (4) which is subsequently used to receive the workpiece, for example a filament rod (5), is formed in this tip. This cavity may have a cylindrical, conical or any other desired shape. Correspondingly, the workpiece likewise has a cylindrical, conical or any other desired shape, which matches the cavity.

The electrode according to the invention may be used for all applications in which homogenized current densities are required in the electrode and on its surface. The electrode according to the invention is preferably used for the deposition of polysilicon.

The more homogeneous current density over the cross section of the rod foot compared with an electrode having a standard shape, i.e. a main body with a tip, results from the lower electrical resistivity of graphite compared with silicon.

At the start of the polysilicon deposition on a filament rod, i.e. when the rod diameter is still thin, with the electrode according to the invention the rod foot initially grows only onto the tip, as in a standard electrode. When using a material with a low thermal conductivity for the electrode, the thermal dissipation through the electrode is low when the rod diameter is small. The electrode tip therefore fuses well with the electrode and grows rapidly into the rod foot. High stability is therefore ensured even at the start of the deposition, and the risk of rods collapsing before reaching the final diameter is minimized.

Since the tip of the electrode according to the invention is surrounded by a raised edge (3), the rod foot which increases in size as the rod diameter increases grows onto the raised edge. The raised edge then provides the rod foot with additional support. Furthermore, the current density at the transition from the electrode to the rod foot is made more uniform by means of the cross section of the raised edge.

With the electrode according to the invention, having a raised edge, a smaller temperature gradient is set up from the middle to the rod surface than in comparison with an electrode having a standard shape. Thermal stresses, which are relaxed by forming cracks and fractures, are therefore minimized compared with a rod foot having a conventional electrode. The smaller temperature gradient in the rod foot with an electrode according to the invention is achieved by a more uniform current density and better thermal dissipation, both of which are ensured by the raised edge.

By varying the height of the raised edge of the electrode according to the invention in relation to the electrode tip, it is possible to vary the local distribution of the current density over the electrode cross section, at the transition from the electrode to the rod foot, as well as the thermal dissipation from the rod foot. An electrode edge placed higher in relation to the electrode tip increases the current density away from the middle of the rod foot. The thermal dissipation from the rod foot is therefore likewise increased. If the electrode tip is higher than the raised electrode edge surrounding it, then the current density in the middle of the rod foot is increased. The thermal dissipation from the rod foot is then reduced.

The raised edge of the electrode according to the invention, surrounding the tip, may be made higher or lower than the tip or have the same height as it. The raised electrode edge may lie from 40 mm below the tip to 60 mm above the tip, a preferred range being from 25 mm below the tip to 25 mm above the tip and a particularly preferred range being from 10 mm below the tip to 10 mm above the electrode tip.

The specific thermal conductivity of the graphite material used, measured at room temperature according to DIN 51908, is from 20 to 200 W/(m*K), preferably from 20 to 120 W/(m*K) and particularly preferably from 20 to 90 W/(m*K).

Owing to the special shape of the electrode, a type of graphite with a low specific thermal conductivity in the range of from 20 to 90 W/(m*K) may be selected as material.

The effect of this is that the rod feet are not cooled partially when the rod diameter is small. Collapse when the rod diameter is small is thereby prevented. Owing to the continuous cylindrical shape, the large electrode cross section in the part which has grown in and homogenization of the current density over the entire electrode cross section, the temperature gradient when the rod diameter is thick is small even when using an electrode material having a comparatively low specific thermal conductivity. The rods still stand stably in the deposition system when the rod diameter is thick. Individual visible cracks at the rod feet are rare. The frequency of collapse after reaching the final diameter is only about 2% of all the batches and no batches collapse before reaching the final diameter during the deposition.

The electrode material has a much higher specific thermal conductivity than polycrystalline silicon in the reaction range of between 900° C. and 1200° C. Since the entire part of the electrode which has grown into the rod foot, except for the small tips, has a solid cylindrical cross section, a much larger cross section than with conventional electrode shapes is available in the case of a large rod diameter for the thermal dissipation in the electrode according to the invention. The thermal dissipation from the rod foot is thereby greatly improved.

A more homogeneous current density over the electrode cross section and a larger electrode cross section at the electrode end next to the rod foot give in total a shallower temperature gradient from the center of the rod foot to its surface. The thermal stresses are therefore less than with known electrodes having an exclusively conical tip. It has been possible to homogenize the current density of the electrode according to the invention over the entire electrode cross section. Owing to the more homogeneous current density and the larger electrode cross section at the electrode end next to the rod foot, the overheating at the center of the rod foot is much less than with electrodes having a conventional shape.

Any electrode holders (6) known from the prior art may be used to receive the electrode according to the invention in the deposition reactor. In order to improve the thermal dissipation of the entire electrode, the electrode holder may also have an additional heat sink (7), which is arranged at the lower end of the base and/or projects into the base. This heat sink is generally a component of the electrode holder, and is preferably made in one piece with the electrode holder. All known materials consisting of material with high thermal and electrical conductivity are suitable as materials, for example metal. The heat sink is cooled by a suitable heat transfer medium, for example water. What is important is a very good thermal and electrical contact of the heat sink with the base, so that there is high electrical and thermal conductivity uniformly over the circumference of the insert. The shape of the heat sink may be any desired shape, a cylindrical or conical shape being preferred, and a conical shape being particularly preferred.

All known types of carbon, which are suitable for use as electrodes, may be used as a material for the electrode according to the invention. For purity reasons, it is preferable to use a highly pure electrographite with different electrical conductivities. It is however also possible to use other materials, for example silicon carbide, carbon fiber reinforced carbon (CFC) composite materials, tungsten or other metals with a high melting point. It is also possible to coat the electrode with materials, for example silicon, silicon carbide, silicon nitride, pyrocarbon, glass carbon or silicenes, i.e. nanosilicon. A layer thickness of less than 100 μm is preferred in this case.

FIG. 1 shows the schematic structure of the electrode according to the invention. The height (L) of the entire electrode, comprising the inner tip and the outer raised edge, is from 70 to 200 mm, preferably from 70 to 150 mm and particularly preferably from 80 to 130 mm.

The diameter (D) of the electrode is from 30 to 100 mm, preferably from 40 to 80 mm and particularly preferably from 45 to 70 mm. The height (LS) of the electrode tip is from 10 to 40 mm, preferably from 15 to 30 mm, particularly preferably from 15 to 25 mm. The diameter (D5) of the electrode tip is from 20 to 50 mm, preferably from 25 to 45 mm and particularly preferably from 30 to 40 mm. The raised electrode edge may lie from 40 mm below the tip to 60 mm above the tip, a preferred range being from 25 mm below the tip to 25 mm above the tip and a particularly preferred range being from 10 mm below the tip to 10 mm above the electrode tip.

The tip may be formed so as to be conical or pyramidal with n sides, n being greater than or equal to 3. A conical tip is preferred. The tip may be arranged centrally or off-center, in relation to the base surface of the electrode. An off-centered arrangement of the electrode tip, and concomitantly of the hole for receiving the filament rod, subsequently allows a horizontal mutual alignment of the thin rods in the reactor. To this end, the electrode may be brought into the optimal position directly or together with the electrode holder by means of a rotational movement. An arrangement of the tip of the electrode with an offset in the range from 0 to 20 mm, in relation to the midpoint of the base surface of the electrode, is preferred.

The diameter (D6) of the inner edge is from 25 to 80 mm, preferably from 35 to 60 mm and particularly preferably from 35 to 50 mm. The cone angle ($\alpha$) is from 15° to 45°, preferably from 20° to 35°, particularly preferably from 20 to 30°, and the angle ($\beta$) is from 0 to 45°, preferably from 20 to 35°, particularly preferably from 20 to 30°. The upper end of the raised edge is given by the thin rod diameter, the angles $\alpha$ and $\beta$, the diameter (D) of the electrode and the diameter (D6) of the inner edge. The width may be from 0 mm (acute edge) to 30 mm, preferably from 3 to 20 mm, particularly preferably from 3 to 10 mm.

The diameter of the heat sink at the upper end (D3) is from 10 to 60 mm, preferably from 10 to 50 mm and particularly preferably from 15 to 45 mm, and at the lower end (D4) from 10 to 60 mm, preferably from 10 to 50 mm and particularly preferably from 15 to 45 mm.

The length (LK) of the heat sink is from 20 to 80 mm, preferably from 20 to 60 mm and particularly preferably from 30 to 50 mm.

Figure 2:
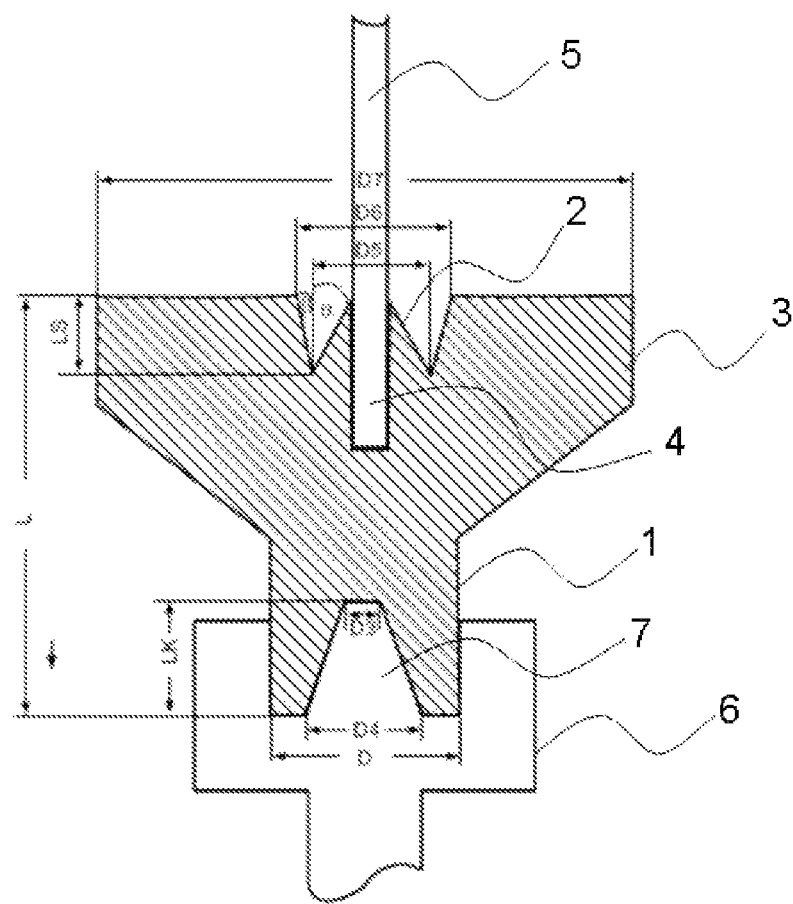
FIG. 2 shows another embodiment of an electrode according to the invention.

In another embodiment of the electrode according to the invention (FIG. 2), the outer raised edge may also be widened and form a stepped or conical transition with the base surface of the electrode. In this embodiment, the widened upper edge has a diameter (D7) of from 30 to 200 mm, preferably from 40 to 150 mm, particularly preferably from 45 to 120 mm. In principle, the upper edge may in this case be formed so as to be acute, rounded, oblique or flat.

As another particular embodiment of the electrode according to the invention, the tip may also consist of a material having a lower thermal conductivity than the base of the electrode. The electrode then consists of at least 2 parts (FIG. 3 and FIG. 4): an electrode base (A) and at least one further inner zone (B) inserted into this base. In addition, the electrode may also have further zones (C) between the zone (A) and the zone (B), in which case the innermost zone receives the thin rod (5). The inserts and base are in this case made of at least 2 different materials, the innermost insert (zone (B)) consisting of the material with the lowest thermal conductivity. The other inserts are made of materials having higher specific thermal conductivities, the specific thermal conductivity preferably increasing from the inside outward.

By division into different zones of different materials and different thermal conductivities, the electrode can be adapted optimally to the various requirements during growth of the material fastened on it, for example a silicon rod. At the start of the growth and therefore when the rod diameter is small, the rod foot initially grows only on the insert with the lower thermal conductivity. Because of the low thermal dissipation through the insert (zone B) owing to the graphite used with a low specific thermal conductivity, little heat is dissipated through the entire electrode and its electrode holder at the start of the growth, and a high temperature is obtained at the connection of the electrode to the silicon rod when the rod diameters are still small. Colder regions at the rod foot, where etching processes may occur owing to excessively low temperature, do not exist. The rod foot therefore fuses rapidly and without defects with the electrode tip (2) in zone (B). Collapse when the rod diameter is small therefore virtually never occurs during the deposition process.

As the deposition process continues and the rods become thicker, the rod foot grows further over the insert onto the base (zone (A)) and grows around the base. Owing to the higher thermal conductivity of the base, the energy can be dissipated very well from the rod foot. The temperature gradient at the rod foot and thermal stresses are therefore greatly reduced. Cracks and fractures at the rod foot occur much more rarely.

The inner zone (B) of the electrode according to the invention may be incorporated directly during production of the electrode or formed as a loose or replaceable insert.

The inner zone (B) in this case forms the tip (2) of the electrode and is fitted in the base with the opposite end from the tip. The connection of the base to the insert may have a conical, cylindrical or any other desired shape. In practice, a conical plug connection has proven expedient since a conical connection ensures that the base and the insert form a mechanically strong connection and have good thermal and electrical contact. An auxiliary material may also be introduced between the zones in order to improve the conductivity.

The further zones (C) optionally arranged between the zones (A) and (B) may in this case constitute a part of the conical tip, a part of the raised edge or parts of both.

The specific thermal conductivity, measured at room temperature according to DIN 51908, of the zone (A) of the preferred embodiment of the electrode according to the invention is from 80 to 200 W/(m*K), preferably from 100 to 180 W/(m*K) and particularly preferably from 130 to 160 W/(m*K). The specific thermal conductivity of the inner zone (B) is from 20 to 100 W/(m*K), preferably from 20 to 80 W/(m*K) and particularly preferably from 20 to 70 W/(m*K).

The electrical resistivity of the graphite material used, measured at room temperature according to DIN 51911, lies between 30 and 5 µohm*m, preferably from 30 to 10 µohm*m, particularly preferably between 30 and 15 µohm*m.

The arithmetic mean roughness value of the surface roughness Ra of the graphite material used, measured according to DIN EN ISO 4287, lies between 1 and 20 µm, preferably between 1 and 15 µm, particularly preferably between 1 and 10 µm with an overall height of the roughness profile Rt between 10 and 200 µm, preferably between 10 and 150 µm, particularly preferably between and 100 µm and an averaged roughness depth Rz between 8 and 160 µm, preferably between 8 and 120 µm, particularly preferably between 8 and 80 µm.

The compressive strength of the graphite material used, measured at room temperature according to DIN 51910, lies between 40 and 250 MPa, preferably between 50 and 200 MPa, particularly preferably between 50 and 150 MPa.

The flexural strength of the graphite material used, measured at room temperature according to DIN 51902, lies between 10 and 100 MPa, preferably between 15 and 80 MPa, particularly preferably between 20 and 70 MPa.

The Young's modulus of the graphite material used, measured at room temperature according to DIN 51915, lies between 1 and 20 GPa, preferably between 2 and 15 GPa, particularly preferably between 3 and 15 GPa.

The linear thermal expansion coefficient of the graphite material used, in the temperature range of from 20 to 1000° C., measured according to DIN 51909, lies between $2*10^{-6}$ and $10*10^{-6}$ 1/K, preferably between $3*10^{-6}$ and $8*10^{-6}$ 1/K, particularly preferably between $3.5*10^{-6}$ and $7*10^{-6}$ 1/K.

The open porosity of the graphite material used, measured according to DIN 51918, lies between 5 and 25%, preferably between 10 and 25%, particularly preferably between 10 and 20%.

Figure 3:
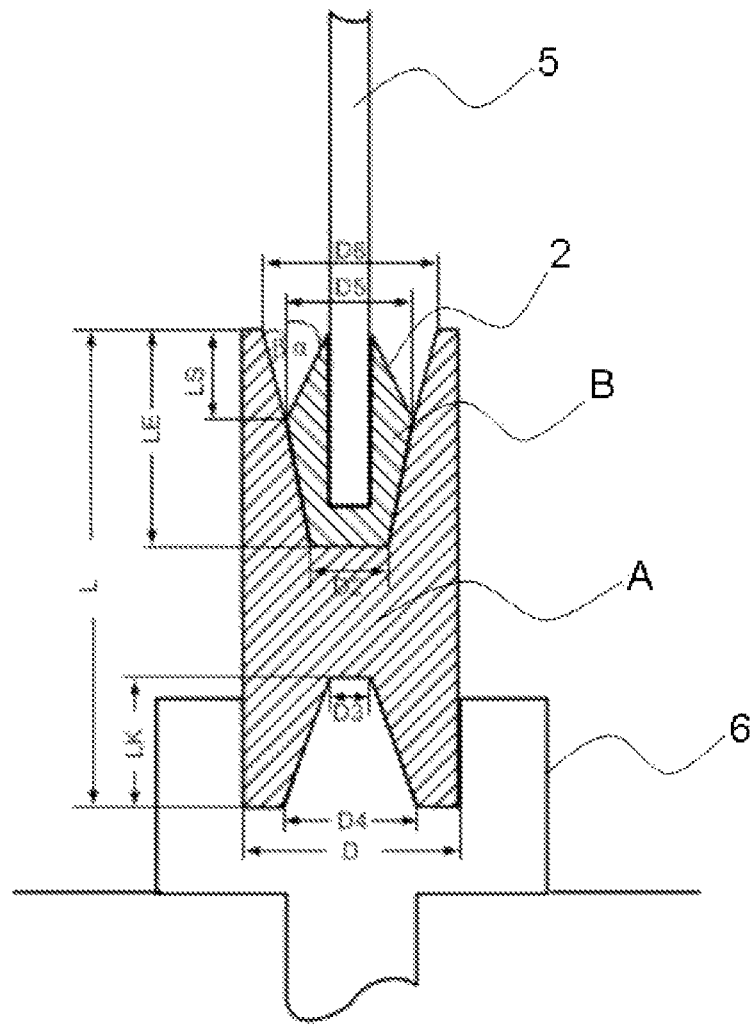
FIG. 3 shows an embodiment of an electrode according to the invention with an insert.
Figure 4:
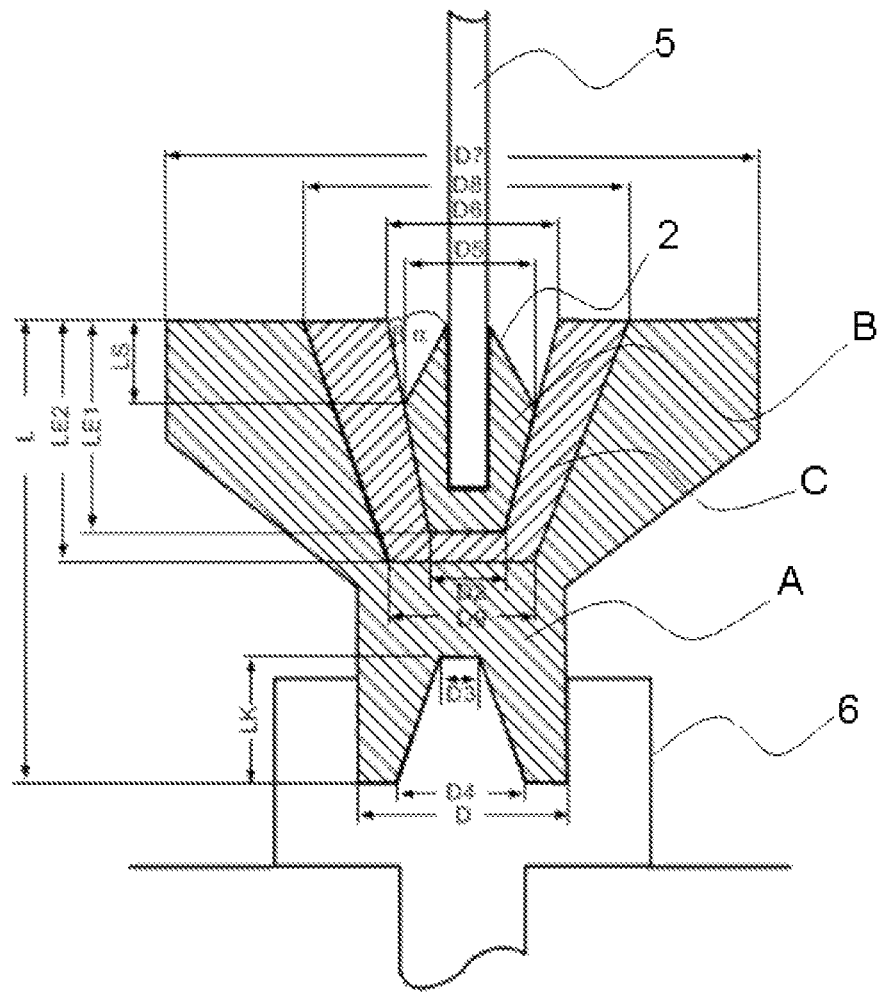
FIG. 4 shows an embodiment of an electrode according to the invention having two or more interconnected insert.

FIG. 3 shows by way of example the particular embodiment of the electrode according to the invention with an insert, so that different zones with different thermal conductivity are formed.

The length (LE) of the inner insert (zone (B)) is from to 90 mm, preferably from 35 to 80 mm and particularly preferably from 35 to 65 mm.

The diameter (D5) of the insert at its widest position is from 20 to 50 mm, preferably from 25 to 45 mm and particularly preferably from 30 to 40 mm.

The diameter (D2) of the insert at its lower end is from 15 to 40 mm, preferably from 20 to 40 mm and particularly preferably from 20 to 35 mm.

The electrode according to the invention may also have or more interconnected inserts (FIG. 4), in which case the inner insert forms the zone (B) with the electrode tip. The inner insert is fitted into a neighboring zone (C), which may in turn fit in a further insert, etc. The last insert fits into zone (A), the base of the electrode.

The different zones with different specific thermal conductivities inside the electrode may also be produced from one piece during the process of producing an electrode. In this case, a one-piece electrode has the inventive different zones of different material and these may also have a fluid transition from the material used to the respective closest zone.

By combining the inventive electrode shape with different inserted zones of different specific thermal conductivity and a widened electrode edge, the overall thermal conductivity of the electrode can be adapted individually to the requirements of the deposition process.

With the special combination of these embodiments, the frequency of collapsed polysilicon rods in the reactor can be eliminated virtually entirely.

Figure 6:
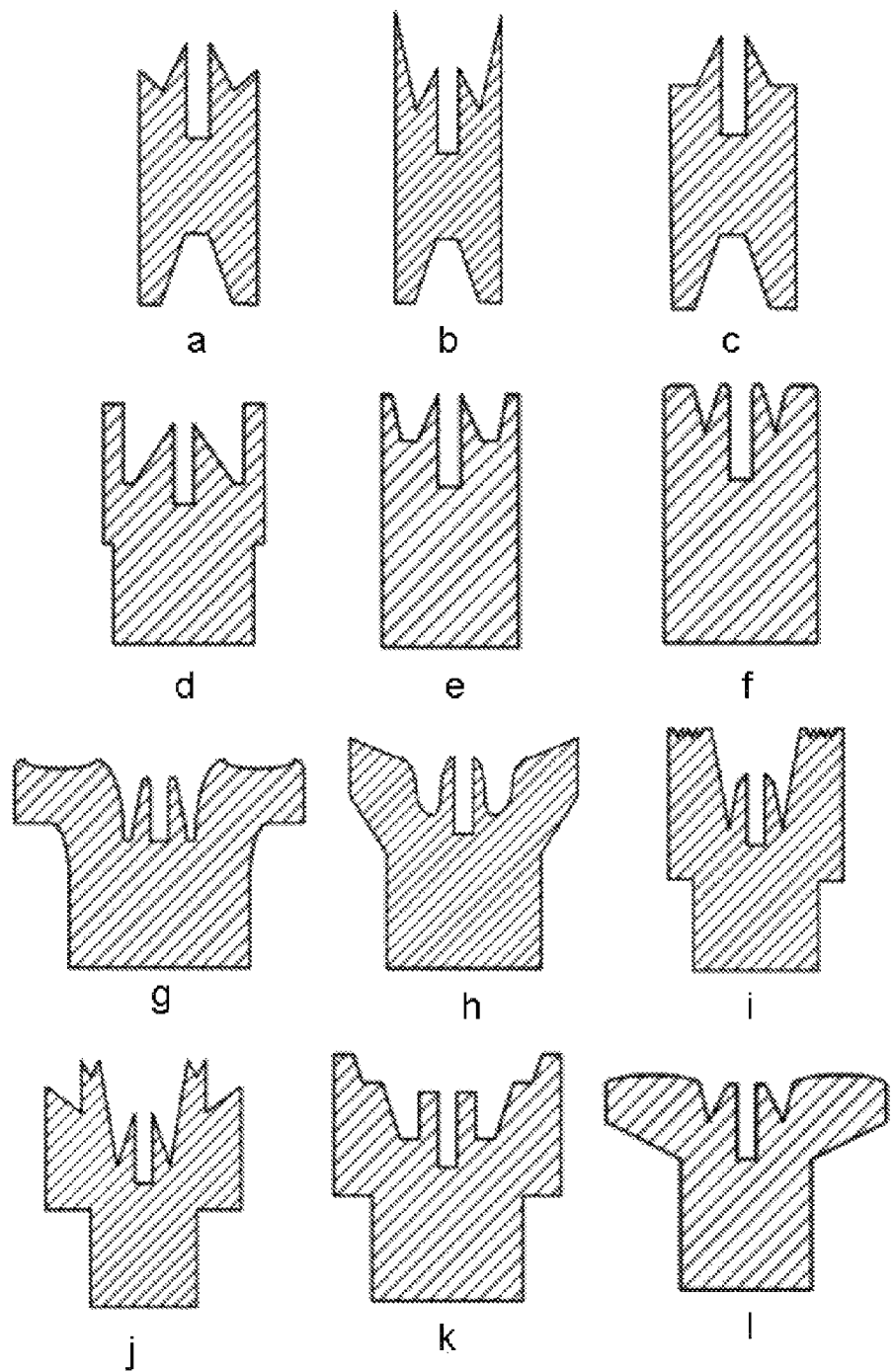
FIG. 6 shows a selection of various shapes of electrodes according to the invention.

FIG. 6 shows a selection of various shapes (a-l) of the electrode according to the invention with and without a widened edge in cross section. For the sake of better clarity, the examples only show electrodes without different zones. Of course, according to their subsequent requirement, all these shapes may also be configured according to the invention as consisting of a plurality of zones with different specific thermal conductivity.

EXAMPLES

The invention will be explained in more detail with the aid of the following examples.

Polycrystalline silicon rods with a diameter of between 140 and 200 mm were deposited in a Siemens deposition reactor. A plurality of embodiments of electrodes were tested. The parameters of the deposition process were respectively the same for all the tests. The tests differed only in the embodiment of the electrode. The deposition temperature in the batch profile was between 1000° C. and 1100° C. During the deposition process, a feed consisting of one or more silane compounds containing chlorine, of the formula $SiH_nCl_{4-n}$, (with n=0 to 4), and hydrogen as a carrier gas was supplied.

Comparative Example 1

Figure 5:
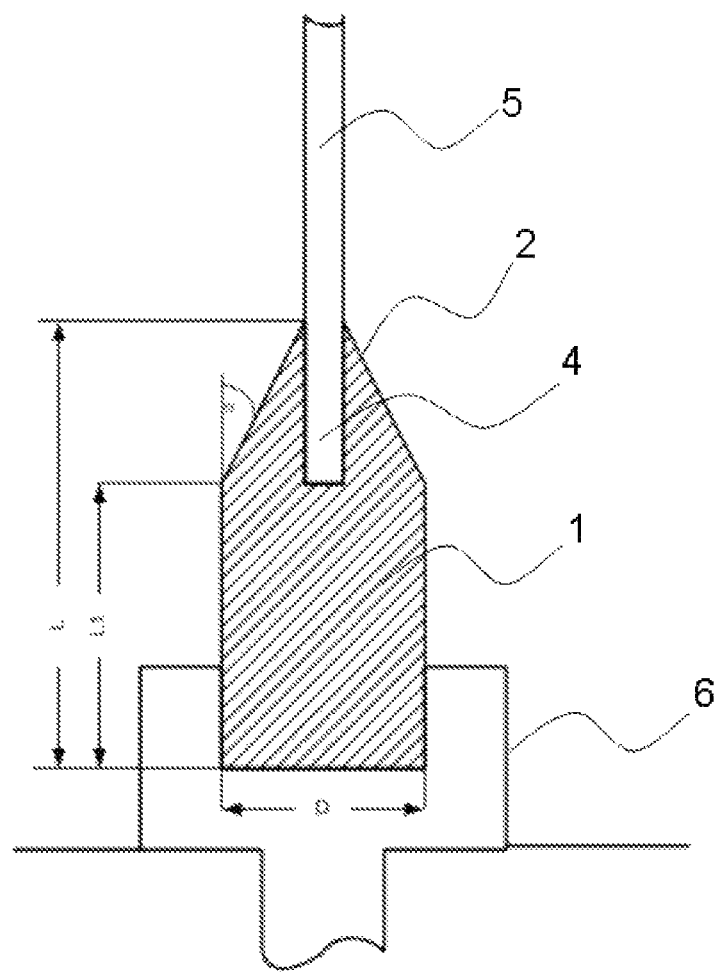
FIG. 5 shows an electrode of the prior art.

Electrodes according to the prior art (FIG. 5) were used for the deposition. The electrodes used consisted of ultrapure electrographite with a specific thermal conductivity of 80 W/(m*K). The total length (L) was 118 mm and the cylindrical length (L1) was 72 mm. The cone angle (α) was 32° and the diameter (D) was 65 mm. An electrode without a heat sink was used.

At the end of the reaction, the reactor was opened and the number of batches with collapsed polysilicon rods was noted. Out of 100 batches, 20 batches had collapsed after reaching the final diameter.

Comparative Example 2

Electrodes according to the prior art (FIG. 5) were used for the deposition. The electrodes used consisted of ultrapure electrographite with a specific thermal conductivity of 150 W/(m*K). The total length (L) was 118 mm and the cylindrical length (L1) was 72 mm. The cone angle (α) was 32° and the diameter (D) was 65 mm. An electrode without a heat sink was used.

At the end of the reaction, the reactor was opened and the number of batches with collapsed polysilicon rods was noted. Out of 100 batches, 10 batches had collapsed before reaching the final diameter during the deposition, and 2 batches after reaching the final diameter.

Example 1

Electrodes according to the invention with a raised edge, as represented in FIG. 1, were used for the deposition. In addition, a heat sink was used on the base of the electrode. The electrodes used consisted of ultrapure electrographite with a specific thermal conductivity of 80 W/(m*K) and an electrical resistivity of 15 µohm*m.

The electrode had the following geometry:

| | |
|---|---|
| total length (L): | 118 mm |
| diameter (D): | 65 mm |
| cone angle (α): | 32° |
| cone angle (β): | 16° |
| electrode tip length (LS): | 21 mm |
| electrode tip diameter (D5): | 34 mm |
| inner edge diameter (D6): | 46 mm |
| heat sink diameter (D3): | 25 mm |
| heat sink diameter (D4): | 45 mm |
| heat sink length (LK): | 50 mm |

At the end of the reaction, the reactor was opened and the number of batches with collapsed polysilicon rods was noted. Out of 100 batches, 2 batches had collapsed after reaching the final diameter but no batches had collapsed before reaching the final diameter during the deposition.

Example 2

Electrodes according to the invention with a raised edge, which consisted of 2 different zones with different specific thermal conductivity (see FIG. 3), were used for the deposition. In addition, a heat sink was used on the base of the electrode. Zone (A) of the electrodes used consisted of ultrapure electrographite with a specific thermal conductivity of 135 W/(m*K) and an electrical resistivity of 10 μohm*m. For the inner zone (B), an ultrapure electrographite with a specific thermal conductivity of 50 W/(m*K) and an electrical resistivity of 22 μohm*m was used.

The electrode had the following geometry:

| | |
|---|---|
| total length (L): | 118 mm |
| diameter (D): | 65 mm |
| cone angle (α): | 32° |
| cone angle (β): | 16° |
| electrode tip length (LS): | 21 mm |
| electrode tip diameter (D5): | 34 mm |
| inner edge diameter (D6): | 46 mm |
| insert length (LE): | 46 mm |
| insert diameter (D1): | 34 mm |
| insert diameter (D2): | 22 mm |
| heat sink diameter (D3): | 25 mm |
| heat sink diameter (D4): | 45 mm |
| heat sink length (LK): | 50 mm |

At the end of the reaction, the reactor was opened and the number of batches with collapsed polysilicon rods was noted. Out of 100 batches, 1 batch had collapsed after reaching the final diameter. No batches had collapsed before reaching the final diameter during the deposition.

Example 3

Electrodes according to the invention with a raised edge were used for the deposition. In addition, the upper edge of this electrode was widened (see FIG. 2).

In addition, a heat sink was used on the base of the electrode. The electrodes used consisted of ultrapure electrographite with a specific thermal conductivity of 80 W/(m*K) and an electrical resistivity of 15 μohm*m.

The electrode had the following geometry:

| | |
|---|---|
| total length (L): | 118 mm |
| diameter (D): | 65 mm |
| cone angle (α): | 32° |
| cone angle (β): | 16° |
| electrode tip length (LS): | 21 mm |
| electrode tip diameter (D5): | 34 mm |
| inner edge diameter (D6): | 46 mm |
| widened edge diameter (D7): | 130 mm |
| heat sink diameter (D3): | 25 mm |
| heat sink diameter (D4): | 45 mm |
| heat sink length (LK): | 50 mm |

At the end of the reaction, the reactor was opened and the number of batches with collapsed polysilicon rods was noted. Out of 100 batches, 1 batch had collapsed after reaching the final diameter, but no batches had collapsed before reaching the final diameter during the deposition.

Example 4

Electrodes according to the invention with a raised edge, which consisted of 3 different zones with different specific thermal conductivity, were used for the deposition. In addition, the upper edge of this electrode was widened (see FIG. 4). A heat sink was used on the base of the electrode. Zone (A) of the electrodes used consisted of ultrapure electrographite with a specific thermal conductivity of 135 W/(m*K) and an electrical resistivity of 10 μohm*m. Zone (C) of the electrodes used consisted of ultrapure electrographite with a specific thermal conductivity of 100 W/(m*K) and an electrical resistivity of 12 μohm*m. For the inner zone (B), an ultrapure electrographite with a specific thermal conductivity of 50 W/(m*K) and an electrical resistivity of 22 μohm*m was used.

The electrode had the following geometry:

| | |
|---|---|
| total length (L): | 118 mm |
| diameter (D): | 65 mm |
| cone angle (α): | 32° |
| cone angle (β): | 16° |
| electrode tip length (LS): | 21 mm |
| electrode tip diameter (D5): | 34 mm |
| inner edge diameter (D6): | 46 mm |
| widened edge diameter (D7): | 130 mm |
| zone (B) insert length (LE1): | 46 mm |
| zone (B) insert diameter (D5): | 34 mm |
| zone (B) insert diameter (D2): | 22 mm |
| zone (C) insert length (LE2): | 55 mm |
| zone (C) insert diameter (D8): | 70 mm |
| zone (C) insert diameter (D9): | 35 mm |
| heat sink diameter (D3): | 25 mm |
| heat sink diameter (D4): | 45 mm |
| heat sink length (LK): | 50 mm |

At the end of the reaction, the reactor was opened and the number of batches with collapsed polysilicon rods was noted. Out of 100 batches, 1 batch had collapsed after reaching the final diameter, but no batches had collapsed before reaching the final diameter during the deposition.

What is claimed is:

1. An electrode comprising carbon having a specific thermal conductivity from 20 to 200 W/(m*K), said electrode comprising:
   a main body having a cross-section defining a base surface of the electrode; and
   a conical or pyramidal tip comprising a device having a cavity adapted to receive a filament rod adapted to grow in size, the conical or pyramidal tip including a top and a base radially outside and longitudinally below the top, wherein the conical or pyramidal tip is surrounded by at least one raised edge radially outside and longitudinally above the base of the conical or pyramidal tip, wherein the raised edge is adapted to avoid collapse of the electrode during a deposition process whereby the filament rod grows in a deposition reactor due to sol silicon deposition on the filament rod, wherein the electrode comprises a plurality of zones of different materials with different specific thermal conductivities, the specific thermal conductivities of materials increasing from the inside outward, and wherein at least one inner zone is a loose or replaceable insert.

2. The electrode as claimed in claim 1, wherein the at least one raised edge ends above, below or at the same height as the tip of the electrode.

3. The electrode as claimed in claim 1, wherein an upper end of the at least one raised edge has a form that is acute, rounded, oblique or flat.

4. The electrode as claimed in claim 1, wherein the tip of the electrode has an offset in a range of from greater than 0 mm to 20 mm in relation to a midpoint of the base of the electrode.

5. The electrode as claimed in claim 1, wherein inner zones are connected to a respective closest outer zone by a plug connection.

6. The electrode as claimed in claim 1, wherein the zones have a common thermal and electrical contact.

7. The electrode as claimed in claim 1, wherein the electrode is coupled to a heat sink at a base of the electrode.

8. The electrode as claimed in claim 1, wherein the electrode comprises highly pure or ultrapure electrographite with different thermal conductivities.

9. The electrode as claimed in claim 1, wherein the electrode comprises carbon material having at least one of the following parameters:
   a) a specific thermal conductivity of 20 to 90 W/(m*K),
   b) an electrical resistivity of 30 to µohm*m,
   c) an arithmetic mean roughness value of a surface roughness Ra 1 to 20 µm with an overall height of a roughness profile Rt between 10 and 200 µm and an averaged roughness depth Rz between 8 and 160 µm,
   d) a compressive strength 40 to 250 MPa,
   e) a flexural strength 10 to 100 MPa,
   f) a Young's modulus 1 to 20 GPa,
   g) a linear thermal expansion coefficient, in a temperature range of from 20 to 1000° C., of $2*10^{-6}$ to $10*10^{-6}$ 1/K, and
   h) open porosity 5 to 25%.

10. The electrode as claimed in claim 1, wherein at least one raised edge is at least 15 mm longitudinally above the base of the conical or pyramidal tip.

11. The electrode as claimed in claim 1, wherein the at least one raised edge ends with a height within 25 mm of a height of the tip of the electrode.

12. A method for producing polycrystalline silicon by depositing highly pure elementary silicon from a gas phase onto a surface of silicon rods, wherein at least one of the silicon rods is held in a deposition reactor by an electrode comprising carbon having a specific thermal conductivity from 20 to 200 W/(m*K), said electrode comprising:
   a main body having a cross-section defining a base surface of the electrode; and
   a conical or pyramidal tip comprising a device having a cavity adapted to receive a filament rod adapted to grow in size, the conical or pyramidal tip including a top and a base radially outside and longitudinally below the top,
   wherein the conical or pyramidal tip is surrounded by at least one raised edge radially outside and longitudinally above the base of the conical or pyramidal tip,
   wherein the raised edge is adapted to avoid collapse of the electrode during a deposition process whereby the filament rod grows in a deposition reactor due to polysilicon deposition on the filament rod,
   wherein the electrode comprises a plurality of zones of different materials with different specific thermal conductivities, the specific thermal conductivities of materials increasing from the inside outward,
   and wherein at least one inner zone is a loose or replaceable insert.

13. An electrode comprising carbon having a specific thermal conductivity from 20 to 200 W/(m*K), said electrode comprising:
   a main body having a cross section defining a base surface of the electrode; and
   a conical or pyramidal tip comprising a device having a cavity adapted to receive a filament rod adapted to grow in size, the conical or pyramidal tip including a top and a base radially outside and longitudinally below the top,
   wherein the conical or pyramidal tip is surrounded by at least one raised edge radially outside and at least 15 mm longitudinally above the base of the conical or pyramidal tip, and
   wherein the raised edge is adapted to avoid collapse of the electrode during a deposition process whereby the filament rod grows in a deposition reactor due to polysilicon deposition on the filament rod, wherein the electrode comprises a plurality of zones of different materials with different specific thermal conductivities, the specific thermal conductivities of materials increasing from the inside outward, and wherein at least one inner zone is a loose or replaceable insert.

14. The electrode as claimed in claim 13, wherein an upper end of the at least one raised edge has a form that is acute, rounded, oblique or flat.

15. The electrode as claimed in claim 13, wherein inner zones are connected to a respective closest outer zone by a plug connection.

16. The electrode as claimed in claim 13, wherein the zones have a common thermal and electrical contact.

17. The electrode as claimed in claim 13, wherein the electrode is coupled to a heat sink at a base of the electrode.

* * * * *